Rodger W. Dart
Richard E. Smythe
INVENTORS

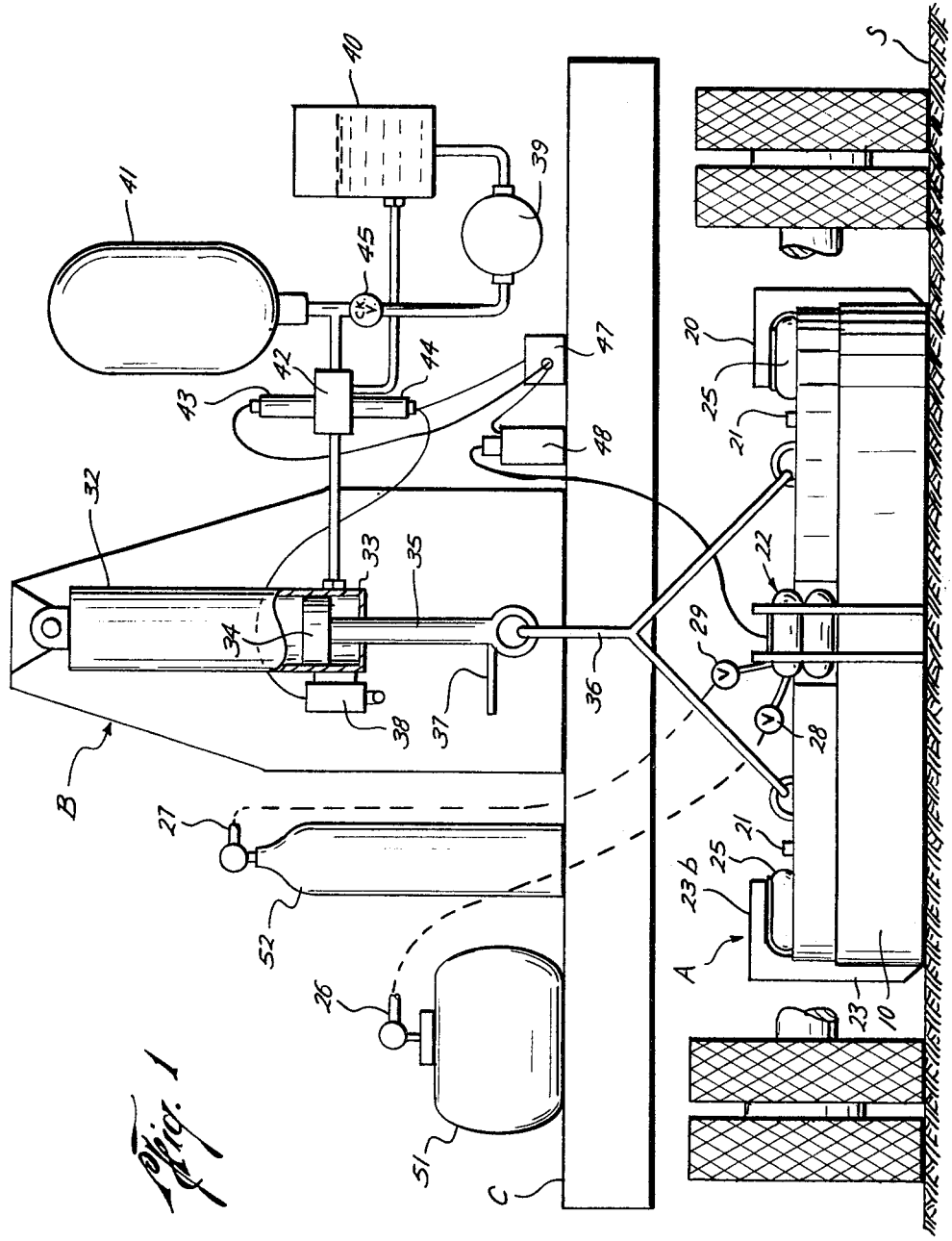

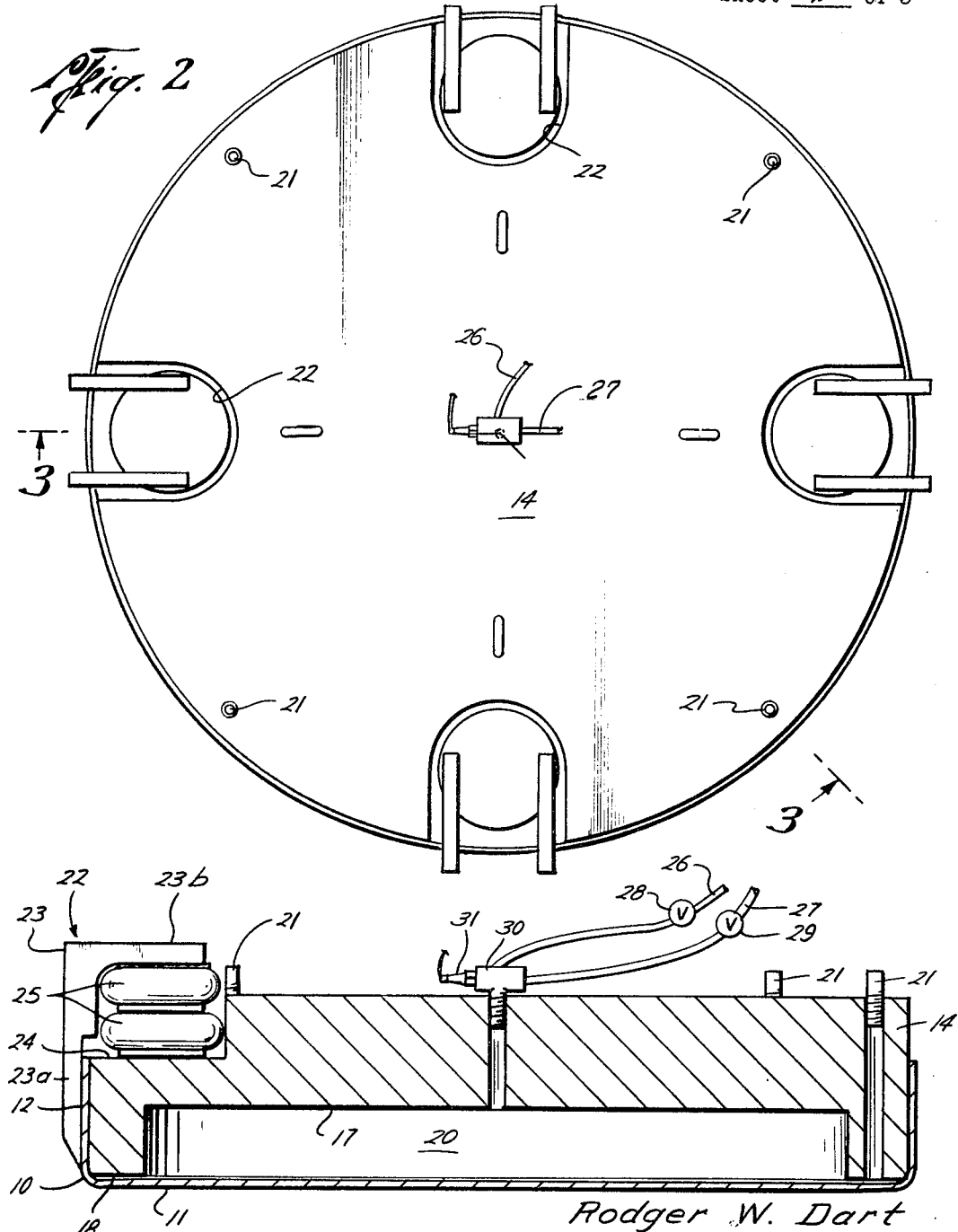

United States Patent Office 3,439,773
Patented Apr. 22, 1969

3,439,773
METHOD OF AND APPARATUS FOR IMPARTING A SEISMIC PULSE TO THE EARTH
Rodger W. Dart and Richard E. Smythe, Houston, Tex., assignors, by mesne assignments, to Sinclair Research, Inc., New York, N.Y., a corporation of Delaware
Filed May 5, 1967, Ser. No. 636,412
Int. Cl. G01v 1/02
U.S. Cl. 181—.5                    16 Claims

ABSTRACT OF THE DISCLOSURE

The present invention relates to a method of and apparatus for imparting a single seismic pulse to the earth's surface as a result of an energy release in which the apparatus is in direct contact with the earth's surface during the major portion of the energy release and thereafter rises or is lifted and is held above the earth's surface to prevent rebound pulses from being delivered to the earth and to allow the earth to respond at its natural frequency.

Background of the invention

In seismic survey work, pulses have been imparted to the earth in many ways. It has been quite common to set off an explosion in a hole drilled in the earth. Also, weights of substantial magnitude have been dropped on the earth's surface. Explosions have been set off in an explosion chamber, one wall of which is formed by a plate element resting upon and in direct contact with the earth's surface. None of these known prior devices have been effective to deliver a single sharp seismic pulse to the earth and to thereafter allow the earth to respond at its natural frequency without multiple pulses and damping of the earth. Also, in some prior devices, such as the above-mentioned explosion chamber device, the weight of a carrier, such as a truck, has been added to the weight of the reaction mass element being lifted by the explosion in an attempt to develop adequate forces for the compressive pulse imparted to the earth. This use of the carrier causes the forces of the explosion to be transmitted back to the carrier and in many instances, is sufficiently severe to cause damage to said carrier.

When the earth is subjected to a compressive pulse, the energy radiating therefrom follows the natural earth movement rather than the initial actuation of the surface of the earth by the applied pulse. Thus, when the earth's surface is deflected by a force which has short duration and then the force is removed completely, the earth material responds at its natural frequency to provide the optimum environment under which seismic pulses should be generated. When the earth's surface is initially subjected to a force, the earth's material is compressed, and thereafter if the force is continued, the earth's surface is deflected until the elastic limits of the material are exceeded causing permanent deformation. The preferred seismic signal is in the elastic range of the earth's material. Coherent noise and source generated noise, which are undesirable in seismic work, result from the conversion of the energy into frictional heat and deformation forces. A seismic signal or pulse permitting the natural earth frequency response without interference of subsequent pulse generations is the most desirable for seismic work.

Summary of the invention

The present invention relates to a method and apparatus for producing a desired seismic signal. It provides a pulse generating apparatus in direct contact with the earth's surface, generating a seismic pulse which is imparted to the earth's surface and immediately thereafter removing the pulse generating apparatus from contact with the earth's surface so that only a single seismic pulse is imparted to the earth and the earth is thereafter free to respond at its natural frequency without interference from or damping by the pulse generating apparatus.

The illustrated form of the present invention includes the release of energy in a chamber defined between a plate element resting on the earth's surface and a reaction mass element vertically movable a limited distance with respect to said plate element whereby responsive to the energy release, the plate element imparts a pulse to the earth and the reaction mass element is accelerated upwardly. Before said reaction mass element reaches the limit of its upward movement with respect to said plate element, it lifts the plate element above the earth's surface. Also, substantially simultaneously with the lifting of the plate element above the earth's surface by the moving reaction mass element, a force is exerted to maintain the plate element and reaction mass element above the earth's surface to thereby prevent multiple pulses from being imparted to the earth, which multiple pulses would generate undesirable noise patterns, both above and below the earth's surface, and render interpretation of the seismic record more difficult. Furthermore, the elimination of the multiple pulses and removal of the pulse generating apparatus from the earth's surface allows the earth to respond at its natural frequency so that there is no damping of the earth's surface within the area of the pulse generation.

The method of the present invention may be used with any suitable seismic pulse generator such as the generators disclosed in the L. G. Kilmer Patent No. 3,235,027 issued Feb. 15, 1966, in the B. McCollum Patent No. 3,260,327 issued July 12, 1966 and in the R. W. McElroy Patent No. 3,029,733 issued Apr. 17, 1962.

An object of the present invention is to provide a method and apparatus for imparting a single seismic pulse to the earth in such manner that there is no interference with the response of the earth to such pulse, whereby an improved seismic signal is generated.

Another object is to provide a method and apparatus for imparting a single seismic pulse to the earth with a pulse generating apparatus and includes removing and maintaining the pulse generating apparatus out of direct contact with the earth's surface after the single seismic pulse has been imparted to the earth to eliminate secondary source noises and damping of the earth's response to said pulse.

Another object is to provide a method and apparatus for imparting a seismic pulse to the earth by an explosive means and wherein the carrier on which the apparatus is mounted is protected from the forces developed by the generation of said pulse.

Still another object is to provide a method and apparatus for imparting a pulse to the ground at a rate sufficient to have an impedance match with the ground.

Brief description of the drawings

These and other objects and advantages are hereinafter described and discussed with reference to the drawings wherein:

FIGURE 1 is a schematic elevation view of the apparatus of the present invention.

FIGURE 2 is a plan view of the preferred form of pulse generating assembly of the present invention.

FIGURE 3 is a sectional view of the pulse generating assembly taken along line 3—3 in FIGURE 2.

Description of the preferred embodiments

Figure 4:
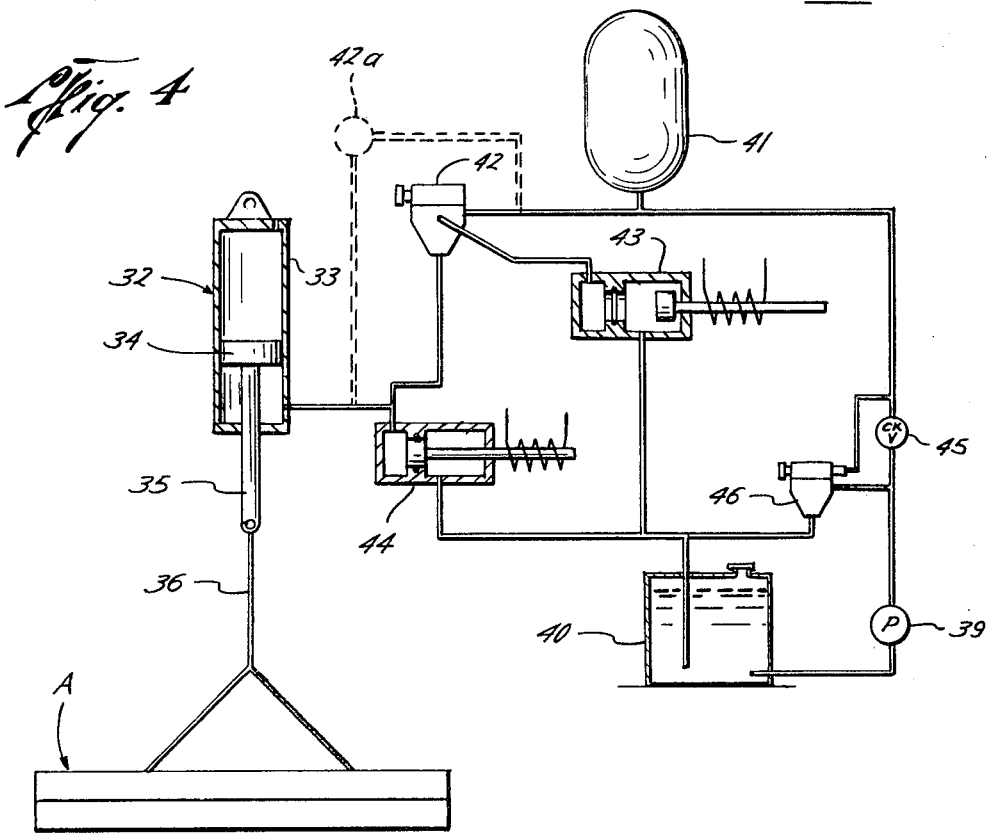
FIGURE 4 is a schematic view showing the hydraulic system for lifting and lowering the pulse generating assembly.

The apparatus of the present invention as illustrated in FIGURE 1 includes the pulse generating assembly A having a plate element in direct contact with the earth's surface and a reaction mass element related to the plate element to form a chamber therebetween. A lifting system B is connected to the assembly A and mounted on a suitable platform such as the truck bed C. Suitable control apparatus is provided to control the initiation of an energy release within the chamber of the assembly A for the development of forces necessary to impart a pulse of desired magnitude and frequency to the earth's surface. Also, the control apparatus includes suitable means for controlling the operation of the lifting system.

In the illustrated embodiment, the energy release is provided by the igniting of an explosive mixture of oxygen and a gas such as propane or butane. The energy release actuates the pulse generating assembly to cause the plate element to impart the desired seismic pulse to the earth's surface.

Subsequent to the imparting of a "single" seismic pulse to the earth's surface, the pulse generating assembly A is removed from and maintained out of direct contact with the earth's surface so that there is no damping of the earth by the assembly A to render the earth free to respond at its natural frequency immediately following the generation of the single pulse.

Pulse generating assembly

The pulse generating assembly A includes the energy transmitting plate 10 which has a circular flat bottom 11 and an annular upstanding rim 12 and the reaction mass element 14 which fits slidably within the rim 12 of plate element 10. When positioned in plate element 10, the lower surface 17 of reaction mass element 14 is above the bottom 11 by the peripheral projection 18 to define the energy release chamber 20 which is vented by passages 21 extending through reaction mass element 14. The explosion of the gases within chamber 20 creates a force downwardly on plate element 10 to impart a pulse to the earth's surface S and also creates a force upwardly on reaction mass element 14 to accelerate reaction mass element 14 upwardly within plate element 10.

To control the rate at which forces are developed and to limit the upward movement of the reaction mass element 14 in plate element 10, the resilient means 22 connects these two elements. Resilient means 22 includes the angle brackets 23 spaced around the assembly A each of which have their vertical legs 23a secured to rim 12 with the horizontal leg 23b extending over the recesses 24 defined in the upper surface of the reaction mass element 14 and the air bags 25 which are supported between the recesses 24 and the horizontal leg 23b of bracket 23. By adjusting the pressure in the air bags 25, the force exerted by the resilient means 22 resisting movement of the reaction mass element 14 in the plate element 10 can be varied to control the rate at which forces are developed by the energy release in chamber 20. Additionally, as the reaction mass element 14 moves upwardly, the resilient means 22 exerts a force upwardly on plate element 10 so that plate element 10 is actually lifted from direct contact with the earth's surface by the upward movement of the reaction mass element 14.

The combustible mixture for the energy release is supplied to chamber 20 by fuel line 26 controlled by valve 28 and oxygen line 27 controlled by valve 29 through mixer 30 which connects into the chamber 20 and is provided with an igniter 31, such as a spark plug. When the chamber 20 is charged with the combustible mixture, the energy release is initiated by igniter 31 to ignite such mixture and thereby provide an explosive combustion.

Thus, the pulse generating assembly A is positioned with plate element 10 in direct contact with the earth's surface, the chamber 20 is charged with a combustible mixture which is ignited to provide an explosive combustion therein and the force of such combustion is exerted through the plate element 10 to impart a compressive pulse to the earth while the reaction mass element 14 contains the explosion and is moved upwardly thereby against the force of the resilient means 22. The pulse to the earth is terminated when the plate element 10 is lifted out of direct contact with the earth's surface by the upwardly moving reaction mass element. A typical example of the acceleration of the reaction mass element 14 by the energy release in the chamber 20 is that a 5,000 pound reaction mass element achieves a velocity of eight feet per second in one inch of vertical travel. While the illustrated pulse generating assembly A has been described as having an energy release resulting from the explosive combustion of a mixture of gases, such as propane and oxygen, other sources of energy release such as compressed gas, compressed mechanical springs, compressed hydraulic fluid, a chemical reaction, or heat, may be used so long as the desired seismic pulse is imparted to the earth's surface and thereafter the source may be removed from direct contact with the earth's surface.

Lifting system

The force used for the removal and maintaining the pulse generating assembly out of direct contact with the earth's surface for the period of the earth's natural response to the seismic pulse is provided by the lifting system B. Lifting system B comprises the hydraulic actuator 32 mounted on truck bed C having a piston 34 movable in cylinder 33 responsive to hydraulic fluid pressure, the piston rod 35, the non-rigid connection 36 which connects piston rod 35 to reaction mass element 14 and suitable means to control the supply of hydraulic fluid to actuator 32. Substantially simultaneously with the initiation of the explosion in chamber 20, the lifting system B is actuated to move piston 34 upwardly in cylinder 33 so that preferably as the plate element 10 is lifted out of direct contact with the earth's surface S by the reaction mass element 14, a lifting force is exerted by the lifting system B on the pulse generating assembly A to hold the assembly A out of direct contact with the earth's surface S. The preferred timing of the operation of the lifting system B is to assume the weight of the pulse generating assembly A as it reaches the highest portion of its upward travel. It is contemplated, however, that the lifting system B may be actuated to lift the pulse generating assembly A above the earth's surface at a time before it is lifted by the energy release provided that sufficient time is provided to transmit the desired seismic pulse to the earth before such lifting takes effect. To protect the carrier from the forces and shock of the energy release, the non-rigid connection 36 allows the reaction mass element 14 to be accelerated upwardly responsive to the explosion in chamber 20 independent of actuator 32 and truck bed C. The upward movement of piston 34 is limited by the engagement of the plate 37 with the limit switch 38 which when actuated shuts off the flow of hydraulic fluid to actuator 32 and may bleed hydraulic fluid from actuator 32 to cause the pulse generating assembly to be lowered as hereinafter explained.

Hydraulic fluid for actuation of the lifting system is supplied by the pump 39 from the reservoir 40 and by the accumulator 41 under control of valve 42. Valve 42 is preferably a fast-acting valve controlled by pilot pressure and solenoid valve 43 controls the pilot pressure in valve 42 so that when solenoid valve 43 is opened to bleed pilot pressure from valve 42 to the reservoir 40, valve 42 opens to deliver hydraulic fluid under pressure to actuator 32 for the lifting of assembly A. When solenoid valve 43 is closed, the hydraulic fluid provides the pilot pressure to hold valve 42 closed. When it is desired to lower the assembly A, valve 42 is closed and solenoid valve 44 is opened to allow hydraulic fluid from actuator 32 to exhaust to the reservoir 40 under the weight of assembly A.

The accumulator 41 which may be the type having a pneumatically loaded diaphragm, assures that a sufficient volume of hydraulic fluid under pressure is available for the operation of the lifting system. Check valve 45 is positioned in the line between pump 39 and accumulator 41 so that the pressure of the hydraulic fluid in accumulator 41 does not bleed to the reservoir 40 through the unloader valve 46 and the by-pass from the pump discharge to the reservoir 40 when system pressure downstream of check valve 45 reaches the preselected pressure for the opening of valve 46. This unloading of the pump discharge allows the pump 39 to run continually to supply hydraulic fluid to the system whenever the pressure downstream of check valve 45 falls below the preselected pressure.

*Control apparatus*

The controller 47 which may be a manual switch or a programmed type controller is connected to solenoid valves 43 and 44 to control the operation of the lift system A. Thus, when it is desired to conduct hydraulic fluid to actuator 32 for lifting assembly A, the circuit to solenoid valve 43 is energized causing it to open. Limit switch 38 may be connected into this circuit to cause the circuit to be opened, allowing solenoid valve 43 to return to its normally closed position when the switch 38 is actuated by the plate 37. Also, switch 38 may be connected to solenoid valve 44 as shown in FIGURE 1 to open valve 44 and allow actuator 32 to lower assembly A onto the earth's surface S. When it is desired to return hydraulic fluid from actuator 32 to the reservoir 40 to lower the assembly A, the circuit to solenoid valve 44 is energized, causing it to open. Normally the solenoid valves 43 and 44 are not open at the same time.

Controller 47 also is connected to control the solenoid valves 28 and 29 and to control ignition of the gaseous mixture in chamber 20 by controlling coil 48 which is connected to fire the igniter 31.

The main function of controller 47 is to substantially simultaneously actuate coil 48 to ignite the gases in chamber 20 and to cause control valve 42 to open so that actuator 32 exerts a lifting force on assembly A by its connection to assembly A as reaction mass element 14 and plate element 10 approach their highest position responsive to the energy release in chamber 20 to thereby assure that assembly A is held above the ground after the plate element 10 has been lifted by the reaction mass element 14. In application, it has been found to be practical to provide a by-pass line around the control valve 42 under control of the pressure regulator 42a to deliver hydraulic fluid to actuator 32 under a preselected pressure which is sufficient to maintain a slight tension in the connection 36. This slight tension eliminates slack in the lifting system so that when it actuates it immediately exerts a substantial lifting force on the assembly A. Care should be taken in the selection of the pressure output of regulator 42a so that it does not cause over travel of the actuator 32.

*Operation*

In operation, the truck which supports the apparatus of the present invention is moved to the desired location where a seismic pulse is to be imparted to the earth and the pump 39 is started. For seismic operations, suitable receptors are positioned as desired to record the earth's vibrations. The assembly A is lowered to the earth's surface S by opening solenoid valve 44 to position plate element 10 in direct contact therewith.

With the assembly A positioned on the ground, solenoid valves 28 and 29 are opened to deliver a mixture of propane from tank 51 and oxygen from tank 52 to the chamber 20. The flow of each gas should be controlled either by regulating the pressures of the gas delivered to the solenoid valves 28 and 29 so that the proper proportions of each gas to provide the explosive mixture flows through the valves during each unit of time the valves are opened or the time during which each valve is open should be controlled by the controller 47 to deliver the proper proportions of each gas to provide an explosive mixture in chamber 20.

Thereafter with valves 28 and 29 closed, and without extended delay (since exhaust passages 21 may vent a portion of the gas mixture from chamber 20) the controller 47 completes a circuit to energize the coil 48 causing igniter 31 to fire, creating the energy release in chamber 20. At substantially the same time, controller 47 completes a circuit energizing solenoid valve 43 to its open position, thereby opening control valve 42 to deliver hydraulic fluid under pressure to actuator 32. The timing of the explosion and the opening of solenoid valve 43 should be controlled to allow time for the piston rod 35 to take the slack out of cable 36 and to commence exerting a lifting force on the reaction mass element 14 as plate element 10 and reaction mass element 14 approach their highest point of rise responsive to the energy release in chamber 20 to thereby assure that the assembly A is held above the earth's surface to avoid additional pulses being imparted to the earth and to allow the earth to respond at its natural frequency without any interference from assembly A. The products of combustion in chamber 20 exhaust through the passages 21.

As hereinbefore stated, controller 47 may be programmed to impart a series of single pulses to the earth at predetermined time intervals. When controller 47 is so programmed, the limit switch 38 when actuated by plate 37 opens solenoid valve 44 to cause the actuator 32 to lower the assembly A back onto the earth's surface S. During this lowering, controller 47 emits a signal to open solenoid valves 28 and 29 so that an explosive mixture is delivered into chamber 20. With the assembly A on the surface S, valve 44 is closed and controller 47 again causes ignition and actuation of the lifting system B as previously described so that as each pulse is imparted to the earth's surface, the lifting is commenced to hold the assembly A above the earth's surface and allow the earth to respond at its natural frequency without interference. The time interval between pulses is best controlled by adjusting the time delay between the time of actuation of limit switch 38 and the time at which solenoid valves 28 and 29 are opened. In this manner, as soon as a sufficient amount of combustible mixture has been delivered to chamber 20, it may be ignited to minimize the leakage of such mixture through the exhaust passages 21. When the desired number of pulses has been imparted to the earth under such a programmed control, the controller 47 may stop the series by closing the solenoid valve 44 immediately after it is opened by limit switch 38. In this position, assembly A is supported above the earth's surface and the complete apparatus may be moved to a new location.

*Modified pulse generating assembly*

Figure 5:
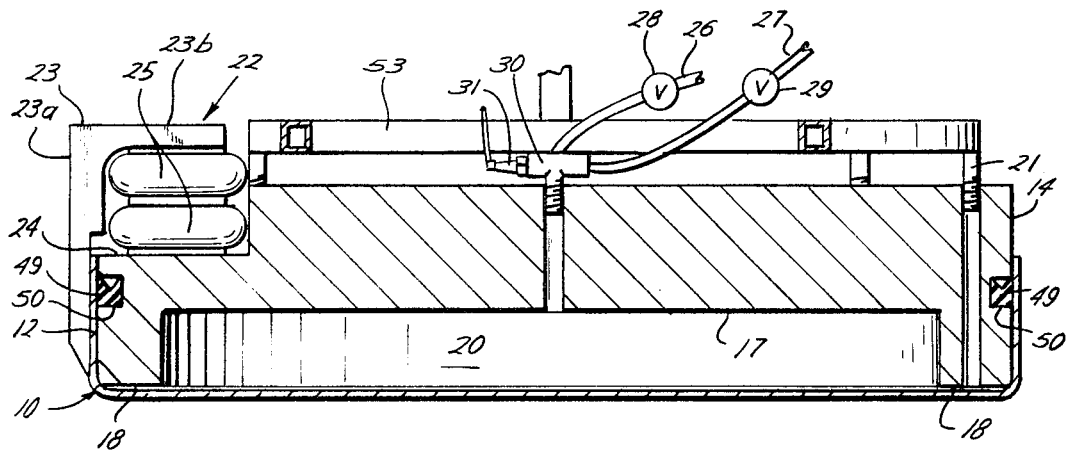
FIGURE 5 is a detailed cross-sectional view of a modified form of pulse generating assembly suitable for use in applications where standing water is present.

The modified assembly A illustrated in FIGURE 5 is substantially the same as the assembly A shown in FIGURES 2 and 3 and the common parts in both figures are designated with the same number. The main difference in the assembly shown in FIGURE 5 is that it is adapted to be used in marshy or other areas having water which might leak into chamber 20 and therefore is provided with suitable sealing means between the exterior surface of the reaction mass element 14 and the interior of the plate rim 12 and the manifolding 53 for the exhaust passages 21. As shown, the sealing means includes the seal 49 positioned in the groove 50 in the outer periphery of the reaction mass element 14.

*Summary of the disclosure*

Thus, with the present invention, a single pulse is imparted to the earth without any damping of the earth's reaction. The forces generated are not dependent upon a restraining weight but rather result from the substanial acceleration of the reaction mass element. The energy release is carried out independent of the supporting platform such as the truck bed C shown to protect this structure from the shock of such energy release. By controlling the pressure in the air bags 25, the rate of acceleration of the reaction mass element 14 and thus the frequency rate of the pulse imparted to the earth may be controlled. By this control, an impedance match with the earth may be achieved to provide the desired single seismic signal.

What is claimed is:

1. A method of imparting a seismic pulse to the earth with a pulse generating apparatus, including the steps of placing the pulse generating apparatus into direct contact with the surface of the earth, exerting a lifting force on the pulse generating apparatus, and subsequently actuating the pulse generating apparatus to impart a seismic pulse to the earth timed to allow substantial completion of the seismic pulse before removal of the apparatus from contact with the earth's surface.

2. The method of imparting a seismic pulse to the earth as claimed in claim 1 further including holding said pulse generating apparatus out of direct contact with the earth's surface to permit the earth to respond at is natural frequency to the seismic pulse.

3. A method of imparting a seismic pulse to the earth as claimed in claim 2 further including returning the pulse generating apparatus into direct contact with the earth's surface, and repeating the steps of exerting a lifting force, subsequently actuating the pulse generating apparatus, and holding.

4. A method of imparting a seismic pulse to the earth with a pulse generating apparatus including the steps of:
   actuating the pulse generating apparatus to impart a pulse to the earth with a reaction lifting force acting on the pulse generating apparatus, and
   exerting a separate lifting force on the pulse generating apparatus timed to act on the pulse generating apparatus when the reaction lifting force subsides to remove and maintain the pulse generating apparatus from contact with the surface of the earth whereby only a single seismic pulse is imparted to the earth.

5. The method of imparting a single seismic pulse to the earth according to claim 4 including the step of:
   holding said pulse generating apparatus out of direct contact with the earth's surface to permit the earth to respond at its natural frequency to the seismic pulse.

6. A method of imparting a seismic pulse to the earth as claimed in claim 5 further including returning the pulse generating apparatus into direct contact with the earth's surface, and repeating the steps of actuating, exerting, and holding.

7. An apparatus for imparting a seismic pulse to the earth comprising:
   (a) pulse generating means for imparting a compressive pulse to the earth and including a rigid bottom plate, a rigid top plate, plate coupling means for coupling said bottom plate and said top plate to define an explosion chamber therebetween and to permit limited vertical movement between said bottom and top plates while causing said bottom plate to move with said top plate after said limited vertical movement is exceeded, means for introducing an explosive mixture into said explosion chamber, and means for igniting an explosive mixture within said explosion chamber;
   (b) a hydraulic lifting system comprising a source of hydraulic fluid, piston means, pump means, and valve means capable of assuming a first position in which hydraulic fluid is passed by said valve means from said source to said piston means under urging of said pump means to cause said piston means to assume a raised position and capable of assuming a second position in which hydraulic fluid is passed by said valve means from said piston means to said source to cause said piston means to assume a lowered position;
   (c) control means including electrical means for actuating said igniting means and for causing said valve means alternatively to assume its first position and its second position;
   (d) platform means for supporting said hydraulic lifting system; and
   (e) flexible coupling means connecting said pulse generating means to said hydraulic lifting system.

8. Apparatus as claimed in claim 7 in which said plate coupling means includes at least one air bag having means for adjusting the pressure therein whereby the rate at which forces are developed in said pulse generating means may be varied.

9. Apparatus as claimed in claim 7 in which said hydraulic lifting system includes pressure regulation means adapted to deliver hydraulic fluid under a preselected reduced pressure to said piston means whereby a slight tension is maintained in said flexible coupling means.

10. An apparatus for imparting a seismic pulse to the earth comprising:
    (a) pulse generating means for imparting a pulse to the earth;
    (b) lifting means including a source of hydraulic fluid, piston means, pump means, and valve means capable of assuming a first position in which hydraulic fluid is passed by said valve means from said source to said piston means under the urging of said pump means to cause said piston means to assume a raised position and capable of assuming a second position in which hydraulic fluid is passed by said valve means from said piston means to said source to cause said piston means to assume a lowered position;
    (c) control means for actuating said pulse generating means and said lifting means and including means for causing said valve means alternatively to assume its first or its second position;
    (d) platform means for supporting said lifting means;
    (e) flexible coupling means connecting said pulse generating means to said lifting means.

11. An apparatus according to claim 10 said lifting means includes:
    a pressure regulator adapted to deliver hydraulic fluid under a preselected reduced pressure to said valve means whereby a slight tension is maintained in said coupling means.

12. An apparatus for imparting a seismic pulse to the earth comprising:
    (a) pulse generating means for imparting a pulse to the earth;
    (b) lifting means;
    (c) platform means for supporting said lifting means;
    (d) flexible coupling means connecting said pulse generating means to said lifting means;
    (e) control means including means for actuating said pulse generating means to generate a seismic pulse and means for actuating said lifting means to remove and maintain said pulse generating means from contact with the surface of the earth at the completion of the seismic pulse.

13. An apparatus according to claim 12 wherein said pulse generating means includes:
    a plate element adapted to be in direct contact with the earth's surface to impart a pulse thereto,
    a reaction mass element movably positioned with respect to said plate element and adapted to be accelerated upwardly with respect to said plate element responsive to an energy release, and
    means connecting said reaction mass element to said plate element whereby the upward movement of said reaction mass element lifts said plate element above the earth's surface at the completion of the pulse.

14. An apparatus according to claim 12 in which:
    said control means provides a series of single seismic pulses to the earth and permitting the earth to respond at its natural frequency between pulses.

15. An apparatus as claimed in claim 12 in which said pulse generating means includes a rigid bottom plate, a rigid top plate, plate coupling means for coupling said bottom plate and said top plate to define an explosion chamber therebetween and to permit limited vertical movement between said bottom and top plates while causing said bottom plate to move with said top plate after said limited vertical movement is exceeded, means for introducing an explosive mixture into said explosion chamber, and means for igniting an explosive mixture within said explosion chamber.

16. The apparatus according to claim 15 wherein said coupling means includes:

at least one air bag having means for adjusting the pressure in such air bag whereby the rate at which forces are developed in said pulse generating means may be varied.

References Cited

UNITED STATES PATENTS

| 3,024,861 | 3/1962 | Clynch | 181—.5 |
| 3,029,733 | 4/1962 | McElroy | 181—.5 |
| 3,260,327 | 7/1966 | McCollum | 181—.5 |
| 3,283,844 | 11/1966 | Peterson | 181—.5 |
| 3,294,194 | 12/1966 | Sloan | 181—.5 |
| 3,295,630 | 1/1967 | Kilmer | 181—.5 |
| 3,318,411 | 5/1967 | Doubt | 181—.5 |

BENJAMIN A. BORCHELT, *Primary Examiner.*

G. H. GLANZMAN, *Assistant Examiner.*